United States Patent [19]
Ellington, Jr. et al.

[11] Patent Number: 5,687,228
[45] Date of Patent: Nov. 11, 1997

[54] UNIVERSAL AMPLIFIED TELEPHONE HANDSET

[75] Inventors: Robert L. Ellington, Jr., Ringgold, Ga.; Thomas N. Quinn, Columbus, Ohio

[73] Assignee: Plantronics, Inc., Santa Cruz, Calif.

[21] Appl. No.: 520,915

[22] Filed: Aug. 30, 1995

[51] Int. Cl.$^6$ .................................................. H04M 1/00
[52] U.S. Cl. ...................... 379/395; 379/387; 379/399; 379/413
[58] Field of Search ........................... 379/395, 387, 379/396, 413, 382, 399

[56] References Cited

U.S. PATENT DOCUMENTS

| | | | |
|---|---|---|---|
| 3,786,200 | 1/1974 | Camenzind | 379/395 |
| 5,185,789 | 2/1993 | Hanon et al. | 379/398 |
| 5,229,721 | 7/1993 | Stade | 379/395 |
| 5,239,579 | 8/1993 | Schuh | 379/395 |

*Primary Examiner*—Krista M. Zele
*Assistant Examiner*—Jacques M. Saint-Surin
*Attorney, Agent, or Firm*—Fenwick & West LLP

[57] ABSTRACT

An amplified telephone handset includes a current sensing circuit that senses the polarity of DC voltage supplied from a telephone base, irrespective of whether the DC voltage is of standard or reverse polarity. This feature allows the amplified telephone handset to operate with telephone bases that supply voltages through a telephone cord of either standard or reverse polarity. The amplified telephone handset also includes a voltage detection circuit that detects "off-hook" or "on-hook" states by detecting the absence or presence of the voltage. If a DC voltage is detected, then the amplified telephone handset is coupled to the telephone base and the voltage detection circuit disconnects the battery from receiver and transmitter circuits in the amplified telephone handset, placing the amplified telephone handset in a "on-hook" state. Conversely, when the amplified telephone handset is removed from the telephone base and no charging voltage is present, the voltage detection circuit connects the battery to the receiver and transmitter circuits in the amplified telephone handset, placing the amplified telephone handset in the "off-hook" state. An LED indicator on the amplified telephone handset indicates the level of electrical charge of the battery by the intensity of the LED diode.

8 Claims, 5 Drawing Sheets

UNIVERSAL AMPLIFIED TELEPHONE HANDSET

BACKGROUND

1. Field of Invention

The present invention relates to telephone systems, and more particularly, to amplified telephone handsets for use with various telephone bases regardless of voltage polarity.

2. Background Art of Invention

A significant portion of telephone users desire a telephone system that amplifies the sound level of received telephone signals at the transducer in the telephone handset. This enables the user to hear otherwise poorly amplified or inaudible sounds.

Typically, in order to obtain a telephone system that includes an amplified telephone handset, the user must purchase a complete telephone system, including the telephone base and amplified telephone handset combination. However, most telephone users already have a telephone system with the various features they desire, such as speed dialing, answering capability, date/time stamping, and so forth. Such users would have to give up these features, or otherwise find them in a telephone system that also provides an amplified telephone handset. In order to provide consumers with a wider variety of telephone systems, it is desirable to provide an amplified telephone handset that can be purchased separately from, and without a telephone base, and that can be used with any existing telephone to replace the non-amplified telephone handset thereof. In this manner, a consumer can keep the features of their existing telephone and still obtain all of the benefits of an amplified telephone handset.

In order to provide an amplified telephone handset that can be used with any existing telephone base, it is necessary to incorporate an amplifier circuit into the receiver and transducer. To provide a useful range of amplification, the amplifier circuit must receive a source of power. Power can be provided from either an internal s source, such as various available types of alkaline batteries, or an external source, such as the power supplied by the telephone base to the amplified telephone handset for conventional operation. Conventional amplified telephone handsets that are supplied in combination with a telephone base use the DC bias from a transmitting pair of signal lines to power a receiver amplifier.

However, a useful amplified telephone handset that is purchased separately from the telephone base cannot rely on the power from the telephone base because the voltage level of the telephone base is often inadequate to provide sufficient amplification. This will generally be the case where the consumer is attempting to use the amplified telephone handset with a conventional non-amplified telephone. Thus, such an amplified telephone handset would operate with some telephone bases and not with others. This does not present a useful solution to the consumer who would have to determine beforehand if his telephone base is adequate for use with the amplified telephone handset. Nor is this a useful solution for the manufacturer of the amplified telephone handset, who would have to field test hundreds of different brands and models of telephone bases to determine which ones are operable with its amplified telephone handset currently, and who would have to supply this information to the consumer to allow the consumer to choose the right amplified telephone handset model. This information would also have to be constantly updated since new telephone models are constantly being introduced. It follows that the amplified telephone handset is desirably battery powered in order to ensure a known power source in addition to any power available from the telephone base.

In a battery powered amplified telephone handset, the batteries will eventually discharge and the amplified telephone handset will no longer operate correctly. The amplified telephone handset can be designed with, for example, standard "AA" alkaline batteries. These batteries supply power to drive the receiver amplifier and transducer circuits in the amplified telephone handset when the handset is in use by a user.

In order for the telephone base to properly operate with an amplified telephone handset, the transmit DC polarity of the amplified telephone handset must have the same polarity voltage as the telephone base. That is, an amplified telephone handset with standard polarity voltage will only work with a telephone bases having standard polarity voltage, and amplified telephone handsets with reverse polarity voltage will only work with telephone bases having reverse polarity voltage. However, since telephone manufacturers have not previously designed their telephone bases to work with other manufacturer's telephone handsets, there is no standard for whether the DC transmit polarity voltage is standard polarity or reverse polarity. The typical consumer is not in a position to determine the DC transmit polarity voltage of their telephone base. Rather, the consumer should be able to purchase the amplified telephone handset without having any knowledge about the technical specification of their telephone system. Accordingly, it is desirable to provide an amplified telephone handset that automatically determines the polarity voltage and that can operate with either standard or reverse polarity voltage of a telephone base.

For an amplified telephone handset with a battery to operate correctly, the receiver amplifier should be powered up with the battery when the amplified telephone handset is removed from the telephone base. At this point the battery is connected to the receiver amplifier for supplying electrical power. Likewise, when the amplified telephone handset is restored to the telephone base, the receiver amplifier should be disconnected from the battery in order to prevent any unnecessary drain on the battery. Thus, it is desirable to provide an amplified telephone handset that automatically detects its "on-hook" or "off-hook" status and connects or disconnects the battery from the receiver amplifier and transducer as needed.

Finally, in a battery-powered amplified telephone handset, there may be occasions, following repeated or continuous use, wherein the battery almost completely discharges. If the battery completely discharges, the telephone system will not be operable by the user until the battery is replaced with a new battery. Since the user may need to use the telephone on an emergency or otherwise important basis, it is desirable to provide the user with a means of visibly determining the current battery level, and thereby allowing the user to timely restore the amplified telephone handset to the telephone base to maintain a sufficient operating charge.

SUMMARY OF THE INVENTION

The present invention provides the desirable features of amplified telephone handset by including a current sensing circuit that automatically senses the voltage polarity of a transmit DC signal provided from the telephone base. The current sensing circuit transfers the electrical current of the DC signal through to an internal battery on a standard signal path for positive polarity voltage and on a reverse signal path for negative polarity voltage. In this manner, an amplified telephone handset is operable with telephone bases that supply DC voltages of either standard or reverse polarity. This allows the consumer to purchase the amplified telephone handset and use it with their existing telephone base without having to determine the voltage polarity of the telephone base, or whether the telephone base is of a suitable brand and model.

In one embodiment, the current sensing circuit for sensing the polarity of the transmit DC voltage employs a full-wave diode-bridge rectifier circuit connected to s receive the DC voltage having either standard or reverse polarity from the telephone base. The rectifier circuit supplies DC voltage of only one polarity to the receiver circuit in the amplified telephone handset, with additional power supplied from the battery to the receiver and transducer circuits. Mother embodiment of the current sensing circuit includes two bipolar transistors, one transistor regulating the standard polarity signal path, and the second transistor regulating the reverse polarity signal path. The first transistor activates upon receiving standard voltage polarity from the telephone base and supplies the DC current to the receiver circuit of the amplified telephone handset. The second transistor activates upon receiving reverse voltage polarity from the telephone base and also supplies the DC current to the receiver circuit. In both cases, the amplified telephone handset receives the correct voltage polarity at its terminals.

The amplified telephone handset of the present invention further includes a voltage detection circuit that determines whether the amplified telephone handset is in an "on-hook" or an "off-hook", and connects and disconnects the battery from a receiver amplifier and microphone accordingly. The voltage detection circuit thereby prevents drainage of battery power when the amplified telephone handset is not in operation, and disconnects the battery from the receiver amplifier and transducer circuits. The voltage detection circuit is comprised of a voltage detection transistor coupled to the current sensing circuit. When the amplified telephone handset is removed from the cradle of the telephone base, the current sensing circuit supplies a voltage to the voltage detection circuit which closes, and connects the battery to the receiver and transmitter circuits. This places the amplified telephone handset in an "off-hook" state. When the amplified telephone handset is placed in the cradle of a telephone base, the voltage detection transistor opens, and disconnects the battery from supplying power to the receiver and transmitter circuits.

The amplified telephone handset of the present invention further includes an LED indicator coupled to the battery and providing a visible signal indicative of the battery strength.

DETAIL DESCRIPTION OF THE PREFERRED EMBODIMENT

Figure 1:
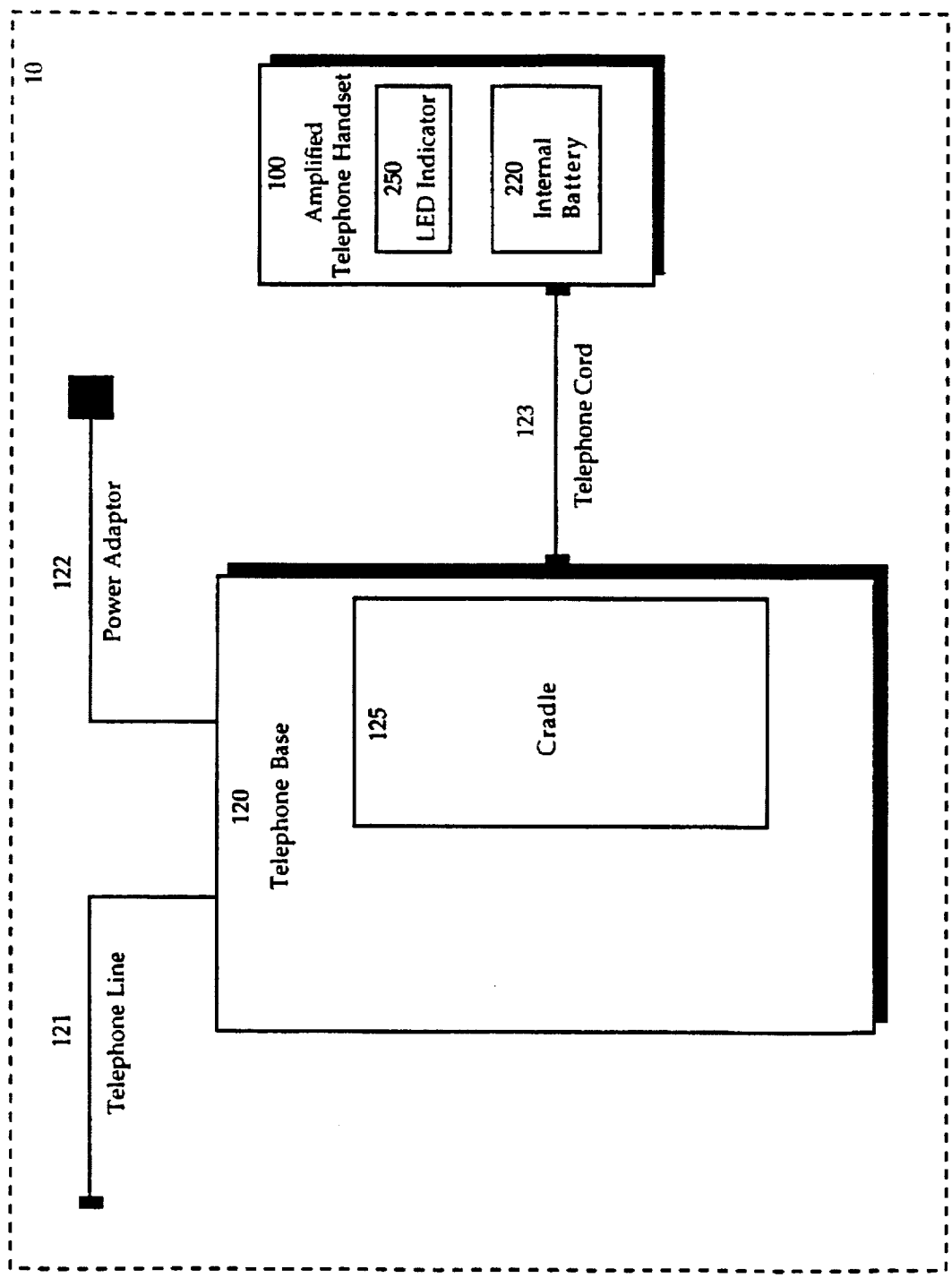
FIG. 1 is an illustration of an amplified telephone handset system of the present invention.

Referring now to FIG. 1, there is shown a simplified block diagram of an amplified telephone handset system 10 of the present invention. An amplified telephone handset 100 receives a transmit DC voltage through a telephone cord 123. The other end of the telephone cord 123 connects to a telephone base 120. The telephone base 120 transmits DC voltage and telephone signals onto the telephone cord 123. The telephone signals are passed to a receiver amplifier and amplified, and output at a transducer (not shown). The transmit DC voltage can be either standard or reverse polarity. The telephone base 120 further includes a cradle 125 for placing the amplified telephone handset 100 in the cradle 125 when the amplified telephone handset 100 is not in operation. A telephone line 121 connects to the telephone base 120 for supplying the telephone signals through a conventional RJ-11 jack. An optional power adaptor 122 connects to the telephone base 120 for supplying power from a wall outlet to the telephone base 120 in order to provide power for features such as an answer system or the like. The amplified telephone handset 100 draws its power from the battery 220 when the handset 100 is removed from the cradle 125 of the telephone base 120. An LED indicator 250 couples to the battery 220 for indicating the level of electrical charge in the battery 220.

Figure 2:
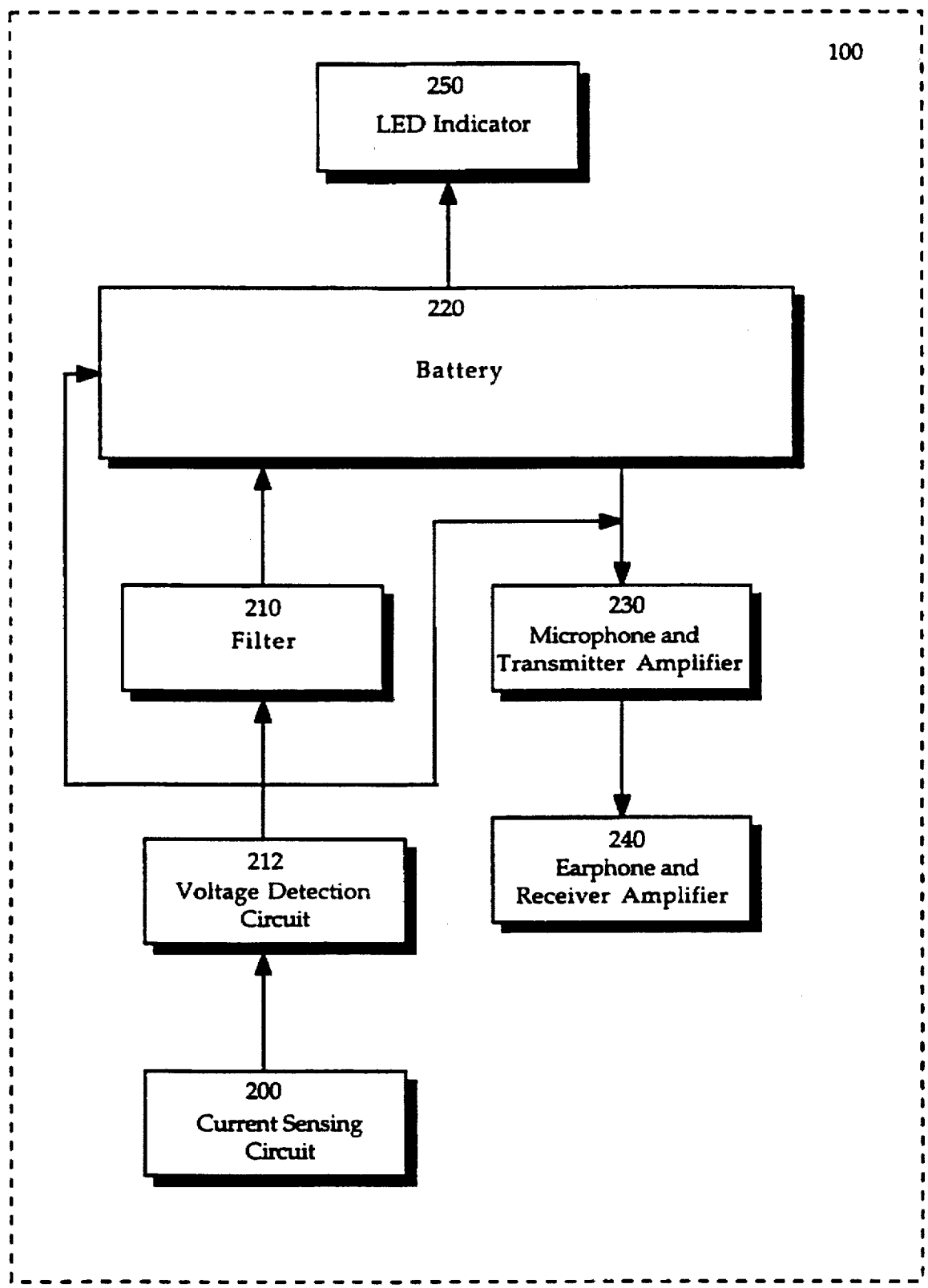
FIG. 2 shows a block diagram of the amplified telephone handset with the s current sensing circuit and voltage detection circuit.

FIG. 2 shows a block diagram of the amplified telephone handset 100 of the present invention. The amplified telephone handset 100 comprises five blocks, namely, a current sensing circuit 200, a voltage detection circuit 212, a transmitter circuit with microphone and an amplifier 230, a receiver circuit with earpiece amplifier and earphone transducer 240, and an LED indicator circuit 250. The amplified telephone handset 100 also includes a filter 210 and the battery 220. The receiver amplifier circuit 240 and the transmitter amplifier circuit 230 operate in a conventional manner to receive and transmit telephone signals. In addition, the LED indicator 250 indicates the level of electrical charge in the battery 220 when the telephone handset 100 is removed from the cradle 125, for example, by gradually diminishing in luminous intensity as the battery charge drops, and by gradually intensifying in luminous intensity as the battery charge increases.

Figure 3:
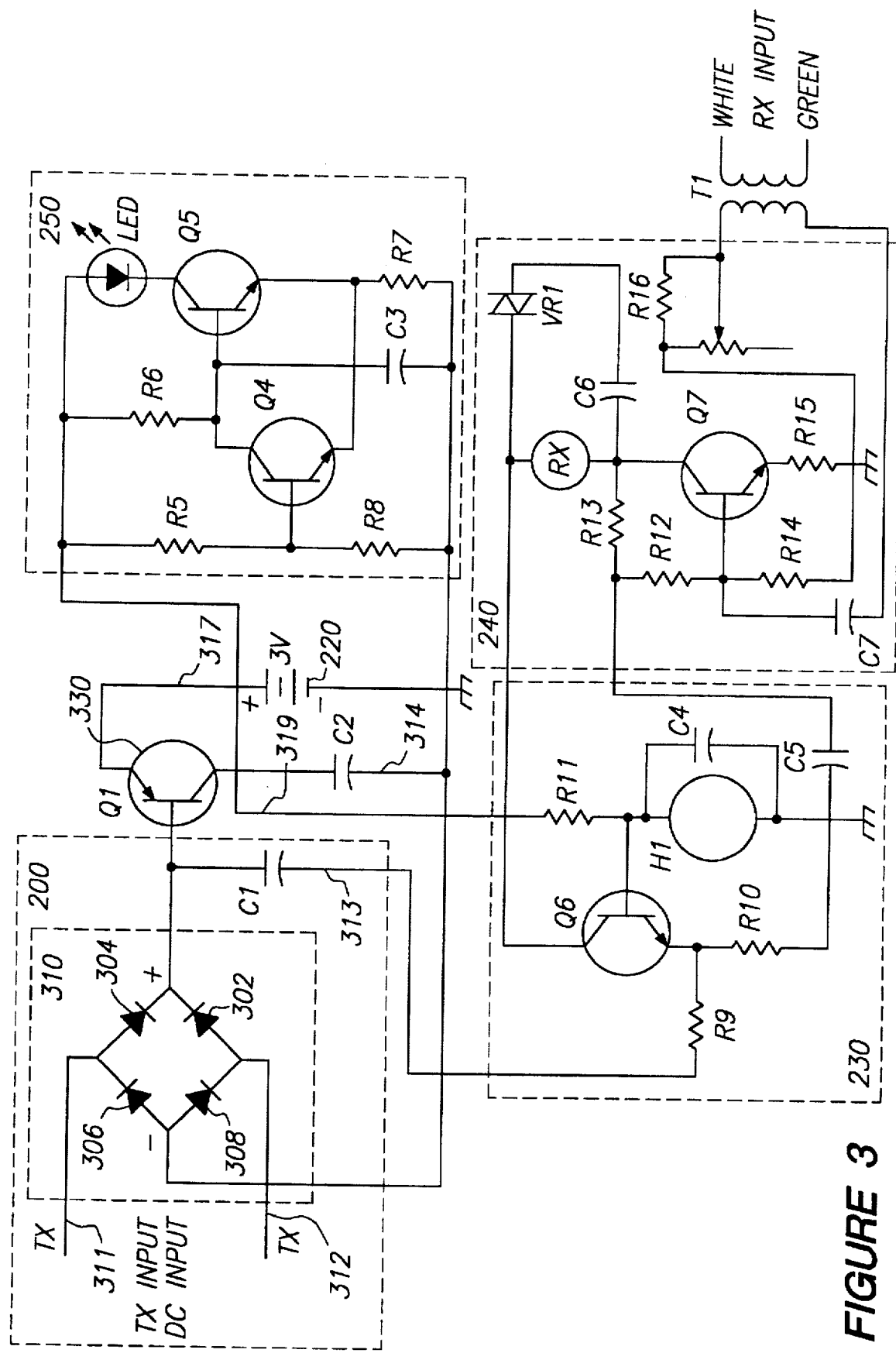
FIG. 3 is a schematic circuit of one preferred embodiment of the current sensing circuit including a full-wave diode-bridge rectifier circuit.

In FIG. 3, there is shown a block diagram of one preferred embodiment of the current sensing circuit 200, along with a voltage detection circuit 212. The current sensing circuit 200 of this embodiment includes a full-wave diode-bridge rectifier 310, comprising four diodes connected in a diamond configuration. The bridge rectifier 310 receives a DC voltage along lines 311 and 312, which are coupled to electrical contacts 101. Diodes 304 and 308 form a positive rectifier, and are activated when the telephone base 120 supplies standard voltage through the telephone cord 123 to the amplified telephone handset 100. Diodes 302 and 306 form negative rectifier, and are activated when the telephone base 120 transmits reverse polarity through the telephone cord 123. Diodes 302 and 304 are connected to an output line 313, and provide voltage of positive polarity to a voltage detection transistor 330 when receiving standard voltage polarity from the telephone base 120. Diodes 306 and 308 are connected to an output line 314, and provide voltage of reverse polarity to the voltage detection transistor 330 when receiving reverse voltage polarity from the telephone base 120. Hence, the amplified telephone handset 100 is capable of receiving standard voltage through diodes 302 and 306 and reverse voltage through diodes 304 and 308. In this manner, the amplified telephone handset 100 can be used with the telephone base 120 that supplies either standard or reverse polarity. Therefore, consumers have an option to purchase the amplified telephone handset 100 operable with any existing telephones to boost the sound level of received telephone signals.

A voltage detection transistor 330, such as a PNP transistor 2N3906, detects whether the amplified telephone handset 100 is in the "on-hook" or "off-hook" state, and appropriately connects and disconnects the battery 220 to the transmitter 230 and the receiver 240 circuits. The base terminal of the voltage detection transistor 330 is coupled to the current sensing circuit 200 along a line 313. The emitter of the voltage detection transistor 330 is coupled to the current sensing circuit 200 along a line 314. The collector terminal of the voltage detection circuit 330 is connected to the positive terminal of the battery 220. The battery 220 is coupled to the LED circuit 250 through line 317. The LED circuit 250 is in turn coupled in parallel to the transmitter 230 and the receiver 240 through a line 319, thereby connecting in series with the battery 220.

In the "on-hook" state, the amplified telephone handset 100 is not in operation and is placed in the cradle 125 of the telephone base 120. In this instance, the current sensing circuit 200 senses the absence of DC voltage from the telephone cord 123 connected to the telephone base 120. Because of the absence of DC voltage, the voltage detection transistor 330 opens, disconnecting the battery 220 to prevent unnecessary drainage of battery power from the transmitter circuit 230 and receiver circuit 240. Conversely, when the user removes the amplified telephone handset 100 from the telephone base 120, the current sensing circuit 200 senses the presence of DC voltage. When the telephone base 120 applies standard voltage polarity to the telephone cord 123, a standard signal path is created between the rectifier circuit 310, the collector terminal of the voltage detection transistor 330, and the battery 220. When the telephone base 120 applied reverse voltage polarity to the telephone cord 123, a reverse signal path is created between the rectifier circuit 310, the emitter terminal of the voltage detection transistor 330, and the battery 220. In either situation, the voltage detection transistor 330 turns on, placing the system 10 in an "off-hook" state. The voltage detection transistor 330 closes, thereby connecting the battery 220 to the transmitter circuit 230 and the receiver circuit 240, thereby powering these circuits in addition to any power supplied from the telephone base 120 via telephone cord 123. The LED indicator 250 is coupled to the battery 220 and indicates the level of charge on the battery 220 thereby allowing the user to determine approximately the remaining usage of the handset 100.

Figure 4:
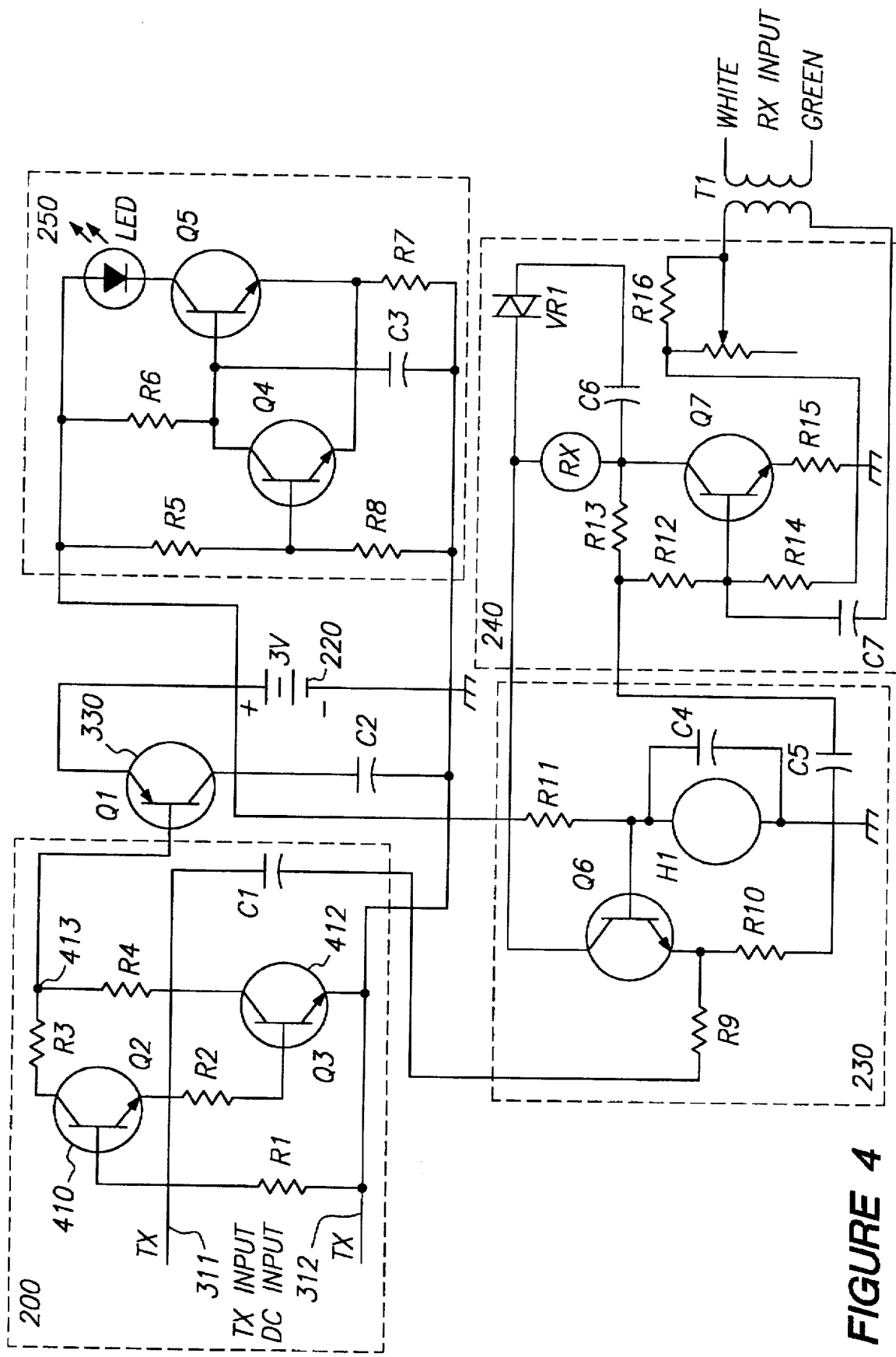
FIG. 4 is a schematic circuit of another preferred embodiment of the current sensing circuit including a transistor configuration.

Referring now to FIG. 4, there is shown a block diagram of another embodiment of the current sensing circuit 200, and also shown is the voltage detection circuit 330. The current sensing circuit 200 of this embodiment includes a bipolar junction transistor configuration with common-emitter silicon transistors 410, 412, such as an industrial standard NPN 2N3904 transistors. The base terminal of the transistor 410 connects to the line 311 for receiving standard signal current from the telephone base 120 through the telephone cord 123. The collector of the transistor 412 connects to the line 312 for receiving reverse signal current from the telephone base 120. The collector terminals of the transistors 410 and 412 connect to a common node of the base terminal of the voltage detection transistor 330, which in turn couples to the battery 220.

In the "on-hook" state, the amplified telephone handset unit is not in operation and is placed back in the cradle 125 of the telephone base 120. The amplified telephones handset 100 operates in the same manner as described in FIG. 3 since the current sensing circuit 200 detects the absence of DC voltage and is inactivated, which in turn disconnects the battery to prevent unnecessary drainage of battery power from the transmitter 230 and receiver 240 circuits. On the other hand, in the "off-hook" state, the current sensing circuit 200, implemented in a transistor configuration, detects DC voltage supplied from the telephone base 120. When standard voltage is applied to the current sensing circuit 200, a standard voltage signal path is created between the transistor 410, the collector terminal of the transistor 330, and the positive terminal of the battery 220. When reverse voltage polarity is applied to the current sensing circuit 200, a reverse voltage signal path is created between the transistor 412, a node 413, and the battery 220. In effect, the transistor 410 regulates the positive polarity voltage supplied to the receiver circuit 240 in the amplified telephone handset 100, and the transistor 412 regulates the negative polarity voltage supplied to the receiver circuit 240 in the amplified telephone handset 100. Furthermore, the voltage detection transistor 330 closes, thereby connecting the battery 220 to the transmitter circuit 230 and the receiver circuit 240, thereby powering these circuits in addition to any power supplied from the telephone base 120 via telephone cord 123. The LED indicator 250 is coupled to is the battery 220 and indicates the level of charge on the battery 220 thereby allowing the user to determine approximately the remaining usage of the handset 100.

Figure 5:
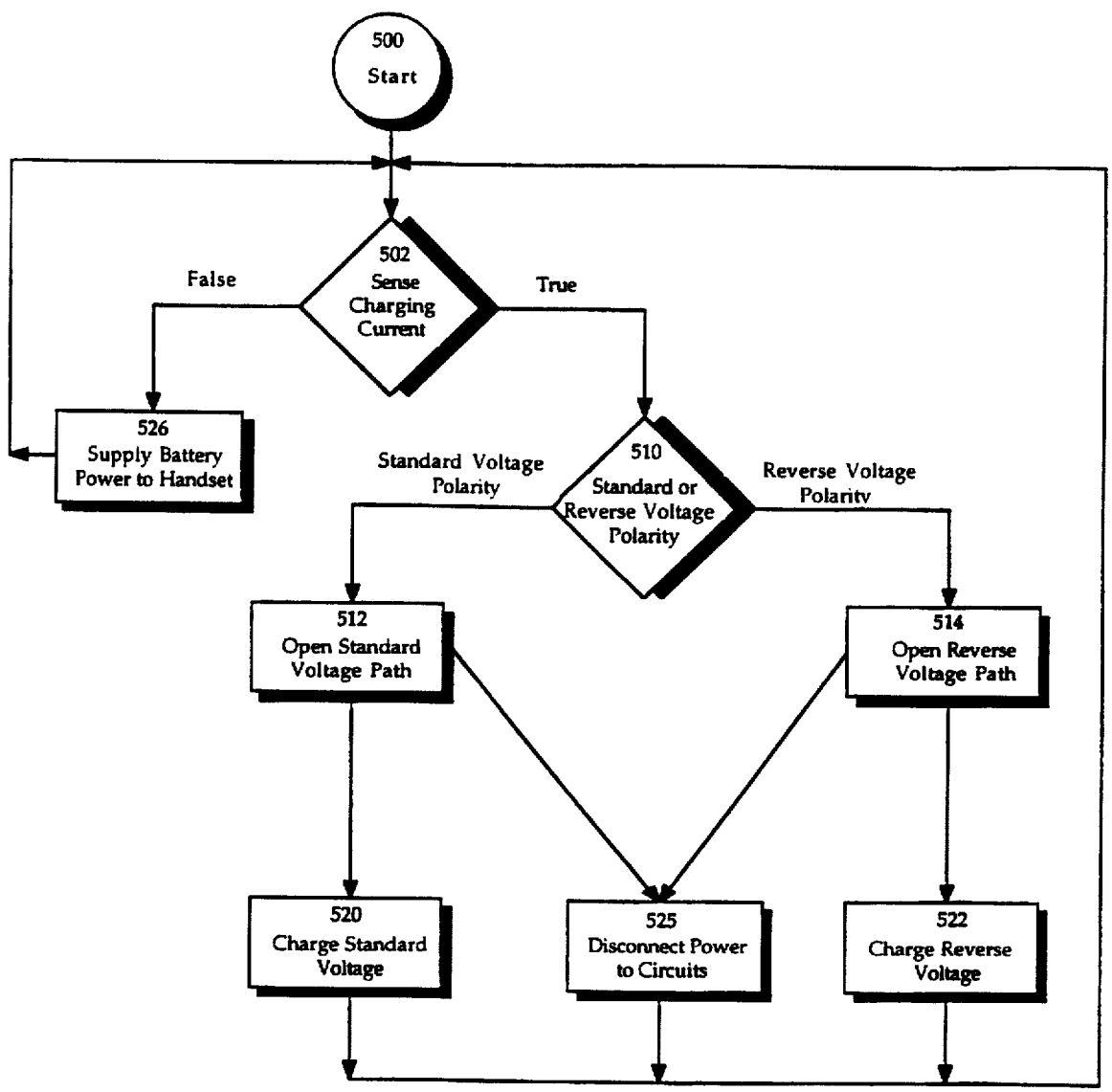
FIG. 5 is a flowgraph of the process for automatically sensing the polarity voltage and for detecting of the presence of a voltage signal.

In FIG. 5, there is shown a process for sensing the polarity of the voltage automatically. The operations of the amplified telephone handset 100 sense standard or reverse voltage polarity to enhance the flexibility of the telephone base 120 and amplified telephone handset 100 combinations and effectively maintain the maximum retention of the battery power. The system senses 510 the presence of a transmit DC voltage, or senses no DC voltage. If the current sensing circuit 200 senses no DC voltage, the battery 220 supplies 526 power to the transmitter 230 and the receiver 240 circuits in the amplified telephone handset 100 in the "off-hook" state. However, if there is DC voltage present from the telephone base 120 to the amplified telephone handset 100, the current sensing circuit 200 activates 512 a standard voltage path or activates 514 a reverse voltage path, depending on the polarity of the detected voltage. The amplified telephone handset 100 is supplied 520 with standard voltage or supplied 522 with reverse voltage, also according to the path being activated. Further, the effect of detecting the presence of DC current of either standard or reverse polarity causes the system to disconnect 525 the battery power supplied to the transmitter 230 and the receiver 240 circuits to conserve unnecessary drainage of the battery 220. The system loops through this detection and activation process until the power is removed from the entire system.

We claim:

1. An amplified telephone handset coupled to a telephone base via a telephone connector, the handset comprising:

a receiver amplifier electrically coupled to the telephone base to receive telephone signals via the telephone connector, for amplifying the received signals;

a transducer coupled to the receiver amplifier to produce the amplified signals;

an electrical storage device electrically coupled to the receiver amplifier for providing electrical power thereto; and a current sensing circuit having electrodes coupled to the telephone connector and receiving therefrom a standard polarity voltage signal or a reverse polarity voltage signal, the current sensing circuit having a first subcircuit for receiving the standard polarity voltage signal and a second subcircuit for receiving the reverse polarity voltage signal, each subcircuit producing a respective voltage signal in a mutually exclusive manner to couple the electrical storage device to the receiver amplifier.

2. The amplified telephone handset of claim 1 further comprising:

a voltage detection circuit coupled between the current sensing circuit and the electrical storage device, having a first state disconnecting the electrical storage device from the receiver amplifier in response to the absence of either the standard polarity voltage signal or the reverse polarity voltage signal, and a second state connecting the electrical storage device to the receiver amplifier in response to the presence of either the standard polarity voltage signal or the reverse polarity voltage signal.

3. The amplified telephone handset of claim 2 wherein the current sensing circuit further comprises:

a first transistor having a first terminal, a second terminal, and a third terminal; and a second transistor having a fourth terminal connected to the first terminal of the first transistor, having a fifth terminal connected to the first terminal of the first transistor, and having a third terminal connected to a common node of the third terminal of the first transistor and the voltage detection circuit.

4. The amplified telephone handset of claim 2 wherein the current sensing circuit further comprises:

a full-wave diode-bridge rectifier having inputs for receiving the standard polarity voltage signal or the reverse polarity voltage signal, and having a first output for supplying the standard polarity, voltage signal to the voltage detection circuit and having a second output for supplying the reverse polarity voltage signal to the voltage detection circuit.

5. In a system including an amplified telephone handset having a battery, and a telephone base supplying a voltage signal having a standard or a reverse polarity through a telephone connector to the handset, a method of operating the amplified telephone handset to cooperate with the telephone base, comprising the steps of:

sensing in the amplified telephone handset the presence of the voltage signal from the telephone base;

responsive to the standard polarity of the voltage signal, supplying the voltage signal of standard polarity to the battery; and, responsive to the reverse polarity of the voltage signal, supplying the voltage signal of the reverse polarity to the battery.

6. The method of claim 5 wherein the amplified telephone handset is comprised of a transmitter circuit and a receiver circuit, each circuit coupled to the battery and receiving power therefrom, the method further comprising the steps of:

responsive to the presence of a voltage signal, connecting the battery to the transmitter and the receiver circuits; and responsive to the absence of the voltage signal, disconnecting the battery from the transmitter and receiver circuits of the amplified telephone handset.

7. The method of claim 5 further comprising the step of:

responsive to the absence of the voltage signal, disconnecting the battery from the receiver amplifier circuit.

8. In a system including an amplified telephone handset having a battery, a receiver amplifier circuit coupled to the battery and receiving power therefrom, and a telephone base supplying a voltage signal having a standard or a reverse polarity to the handset, a method of operating the amplified telephone handset to cooperate with the telephone base comprising the steps of:

sensing in the amplified telephone handset a presence or an absence of the voltage signal from the telephone base;

responsive to the presence of the voltage signal, detecting whether the voltage signal is the standard polarity voltage signal or the reverse polarity voltage signal;

coupling the battery to the receiver amplifier circuit if the detected voltage signal is the standard polarity voltage signal; and coupling the battery to the receiver amplifier circuit if the detected voltage signal is the reverse polarity voltage signal.

* * * * *